United States Patent
Fleagle et al.

(10) Patent No.: US 6,343,703 B1
(45) Date of Patent: Feb. 5, 2002

(54) ANTI-TWO BLOCK DEVICE USING NON-CONTRACT MEASURING AND DETECTING DEVICES

(75) Inventors: Jon E. Fleagle; Dennis W. Eckstine, both of Waynesboro, PA (US); William W. Banks, New Market, MD (US); Francis R. Eyler, Hanover, PA (US)

(73) Assignee: Grove U.S. L.L.C., Shady Grove, PA (US)

( * ) Notice: Subject to any disclaimer, the term of this patent is extended or adjusted under 35 U.S.C. 154(b) by 0 days.

(21) Appl. No.: 09/205,298

(22) Filed: Dec. 4, 1998

Related U.S. Application Data

(60) Provisional application No. 60/067,815, filed on Dec. 5, 1997, and provisional application No. 60/069,055, filed on Dec. 10, 1997.

(51) Int. Cl.[7] .......................... B66C 23/90; B66C 13/18; B66C 13/12
(52) U.S. Cl. ................ 212/281; 212/276; 212/284
(58) Field of Search ................ 212/281, 280, 212/276, 284; 340/688; 180/167, 169

(56) References Cited

U.S. PATENT DOCUMENTS

| | | | | |
|---|---|---|---|---|
| 3,863,772 A | * | 2/1975 | Schwartz | .................... 212/281 |
| 3,922,789 A | | 12/1975 | Sarrell | |
| 3,969,714 A | | 7/1976 | Greer | |
| 4,280,628 A | | 7/1981 | Goss et al. | |
| 4,300,134 A | | 11/1981 | Paciorek | |
| 4,334,217 A | | 6/1982 | Nield et al. | |
| 4,370,713 A | * | 1/1983 | McCoy, Jr. et al. | ......... 212/281 |
| 4,753,357 A | * | 6/1988 | Miyoshi et al. | ............. 212/281 |
| 5,343,739 A | * | 9/1994 | Curry | ......................... 212/281 |
| 5,481,248 A | | 1/1996 | Kruh | |
| 5,491,549 A | * | 2/1996 | Wishner et al. | ............. 212/275 |
| 5,519,400 A | | 5/1996 | McEwan | |
| 5,521,600 A | | 5/1996 | McEwan | |
| 5,581,256 A | | 12/1996 | McEwan | |
| 5,632,391 A | | 5/1997 | Erdmann | |
| 5,645,181 A | * | 7/1997 | Ichiba et al. | ................ 212/281 |
| 5,878,896 A | * | 3/1999 | Eudier et al. | ............... 212/275 |
| 5,967,347 A | * | 10/1999 | Miyata et al. | .............. 212/275 |

FOREIGN PATENT DOCUMENTS

| | | | | |
|---|---|---|---|---|
| DE | 1580794 | * | 7/1970 | ................. 180/169 |
| EP | 0490012 A1 | | 6/1992 | |
| JP | 5-186189 | * | 7/1993 | ................. 212/280 |
| JP | 5-229784 | * | 9/1993 | ................. 212/280 |
| JP | 6-56385 | * | 3/1994 | ................. 212/280 |
| WO | WO9745358 | | 12/1997 | |

* cited by examiner

Primary Examiner—Eileen D. Lillis
Assistant Examiner—R. B. Johnson
(74) Attorney, Agent, or Firm—Birch, Stewart, Kolasch & Birch, LLP

(57) ABSTRACT

In the anti-two block device, a non-contact measuring device detects in one form or another the distance between a boom nose and a load-bearing member supported thereby. If the distance detected is less than a predetermined threshold value, the device triggers a warning or other operation to assist an operator in preventing anti-two blocking.

4 Claims, 2 Drawing Sheets

ANTI-TWO BLOCK DEVICE USING NON-CONTRACT MEASURING AND DETECTING DEVICES

This application claims benefit of provisional Nos. 60/067,815 filed Dec. 5, 1997 and provisional No. 60/069,055 filed Dec. 10, 1997.

BACKGROUND OF THE INVENTION

1. Field of the Invention

The present invention relates to devices for cranes and aerial work platforms; and more particularly, to an anti-two block device for cranes and aerial work platforms using non-contact measuring and detecting devices.

2. Description of Related Art

Conventional anti-two block devices rely on physical contact between elements of the device to detect when anti-two block is imminent. Devices which rely on contact, however, have a limited life span because each physical contact serves to wear and degrade the device. Contact devices also fail because of external factors which prohibit the detection of contact. For instance, most contact devices use electrical switches, and freezing rain can prevent such switches from functioning. Furthermore, most contact devices only provide a discreet measurement. When contact occurs, this contact indicates that, for example, anti-two blocking is imminent. Such contact devices cannot supply a continuously varying real-time measurement. Contact devices also have slow response times. Accordingly, contact devices include a certain amount of error.

SUMMARY OF THE INVENTION

The anti-two block device according to the present invention includes a non-contact measuring device which detects in one form or another the distance of a load-bearing member from the nose of a boom. By comparing the detection results to one or more predetermined threshold values, the anti-two block device according to the present invention can assist an operator in preventing anti-two blocking in various ways.

For instance, when the distance measured by the non-contact measuring device indicates a distance between the boom nose and the load-bearing members is less than a first predetermined threshold, a warning light is driven and/or the movement of the load-bearing member is slowed. If the measured distance falls below a second predetermined threshold, then movement of the load-bearing member is stopped completely.

The present invention contemplates the use of numerous different non-contact measuring devices such as micro-impulse radar, a sonic measuring device, an ultrasonic measuring, an infra-red measuring device, and a laser measuring device.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
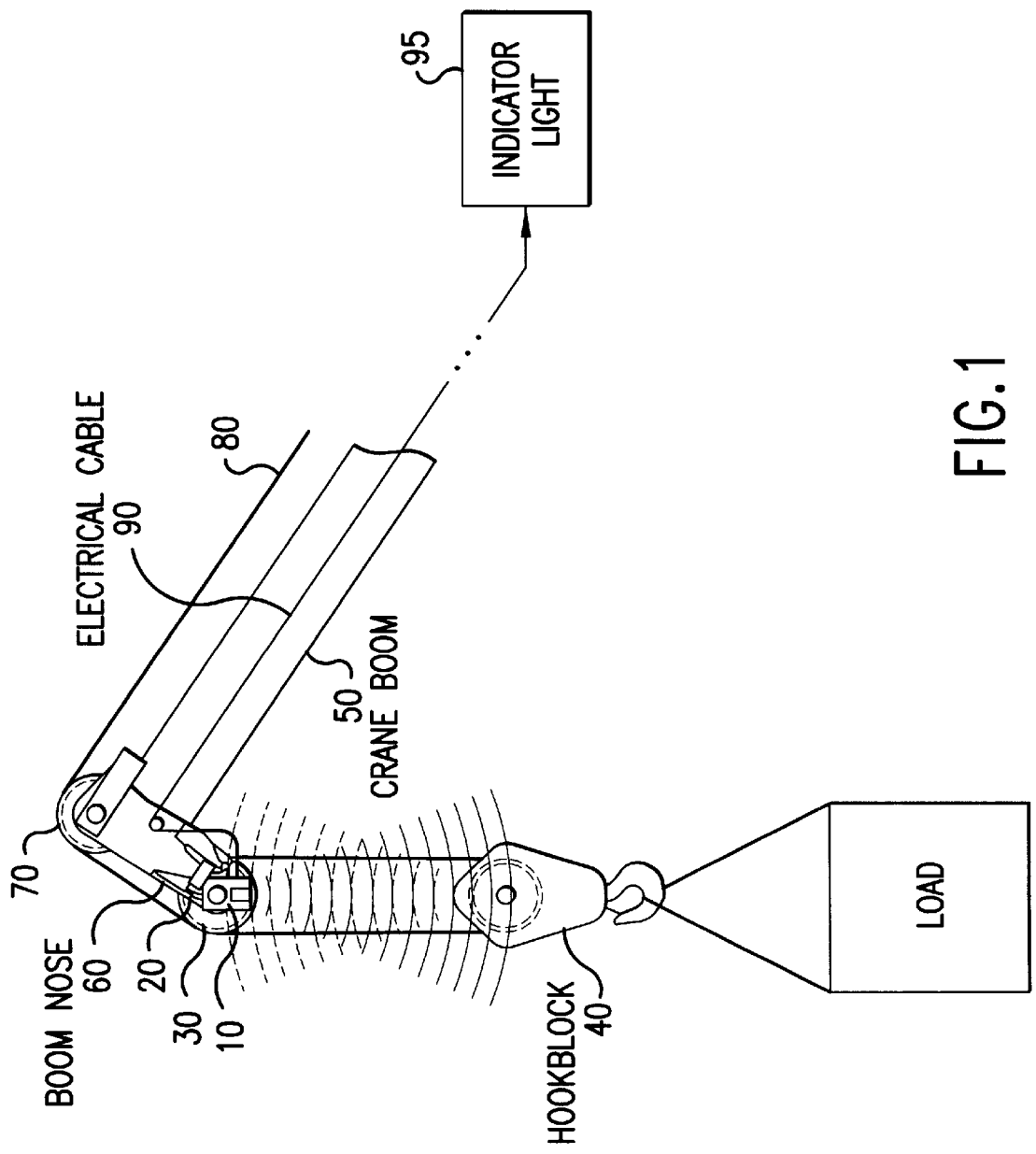
FIG. 1 illustrates an embodiment of an anti-two block device according to the present invention.

FIG. 1 illustrates one embodiment of an anti-two block device according to the present invention. As shown in FIG. 1, a crane boom 50 includes a boom nose 60, and the boom nose 60 includes upper boom nose sheaves 70 and lower boom nose sheaves 30. A cable 80 extends from the boom nose 60, and is connected to a load bearing hookblock 40. A hoist (not shown) controls movement of the cable 80; and thus, the hookblock 40. A micro-impulse radar (MIR) system 10, according to the present invention is mounted on a pivot plate 20, which is attached to the shaft of the lower boom nose sheaves 30. Because the MIR system 10 is mounted on the pivot plate 20, the transmit and receive antennas (not shown) of the MIR system 10 always point in the direction of the hookblock 40 regardless of the elevation angle of the boom 50.

As is well-known, MIR systems emit short-range ultra-wideband pulses, and detect the reflection of these pulses off of a body. Based on the reflected pulses, namely, the time delay between transmission and reception of the pulses, the MIR systems determine, among other things, the distance to the body. Besides an MIR system, the anti-two block device 10 can be any device which measures the distance to a body without relying on contact such as sonic, ultra-sonic, infra-red and laser distance measuring devices.

The MIR system 10 is calibrated to transmit a warning signal to the crane operator via an electric cable 90 when the hookblock 40 is within a predetermined distance of the boom nose 60. For instance, in the embodiment of FIG. 1, the warning signal drives an indicator light 95, and, in another embodiment, drives an indicator light and a control system (not shown) which prevents further movement of the hookblock 40 towards the boom nose 60.

In an alternate embodiment, the MIR system 10 is calibrated to transmit first and second warning signals to the crane operator via the electric cable 90 when the hookblock 40 is at first and second predetermined distances, respectively, from the boom nose 60; the second predetermined distance being less than the first predetermined distance. The first warning signal drives a hydraulic valve (not shown) causing the line speed of the cable 80 to decrease, and the second warning signal drives the control system which prevents further movement of the hookblock 40 towards the boom nose 60. This technique allows cable 80 to travel at the maximum line speed until the hookblock 40 reaches the first predetermined distance from the boom nose 60.

Figure 2:
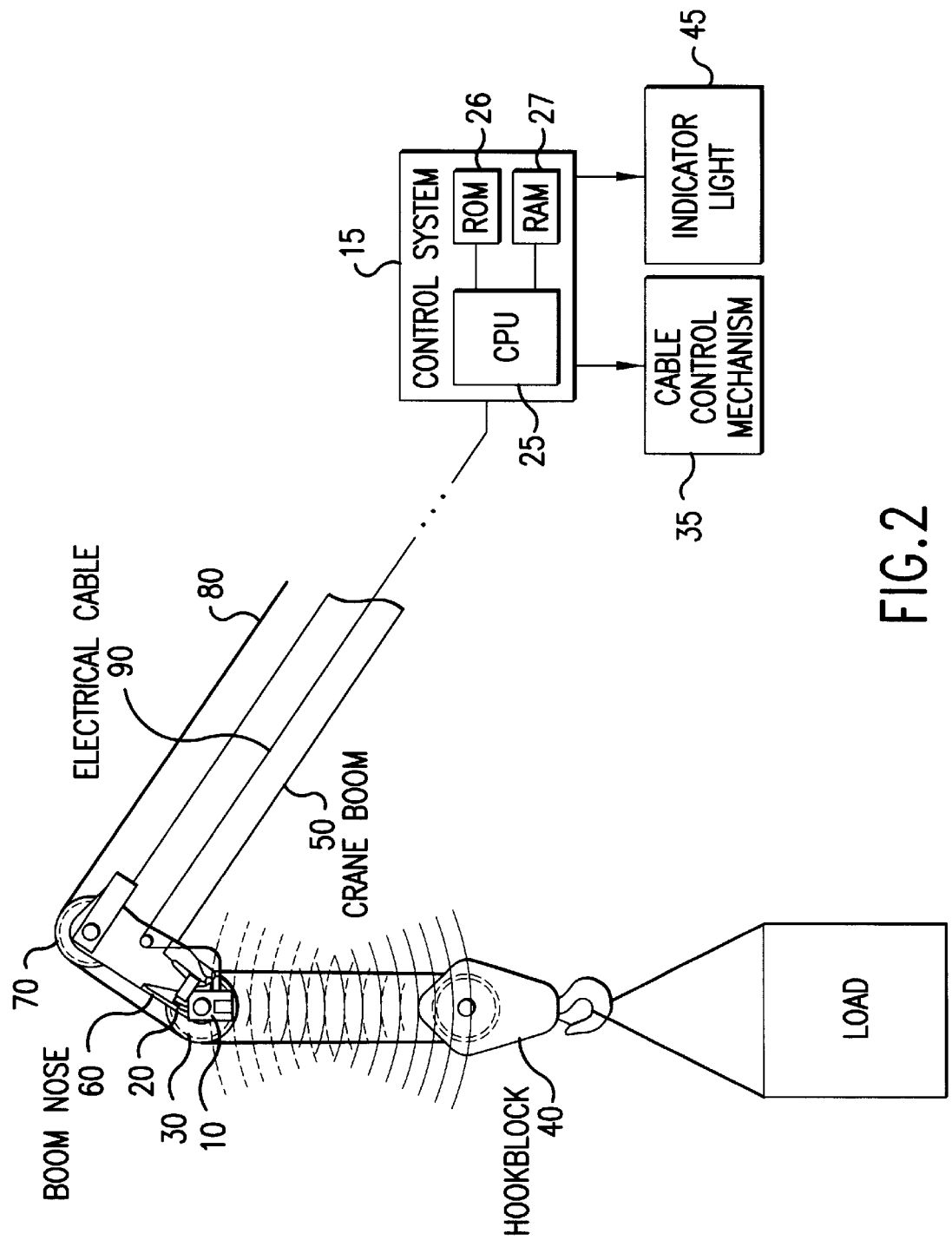
FIG. 2 illustrates another embodiment of a anti-two block device according to the present invention.

A further embodiment of the anti-two block device according to the present invention is shown in FIG. 2. In this embodiment, the MIR system 10 supplies the distance measurement, as opposed to warning signals, to a control system 15, which includes a processor 25 connected to a ROM 26 and a RAM 27. The control system 15 compares the distance measurement to the first and second predetermined distances. When the distance measurement from the MIR system 10 exceeds the first predetermined distance, the control system 15 output controls signals to a cable control system 35 to reduce the line speed of the cable 80 and to an indicator light 45 to warn the operator. When the distance measurement from the MIR system 10 exceeds the second predetermined distance, the control system 15 output controls signals to the cable control system 35 to stop movement of the cable 80.

Instead of supplying the distance measurement to the control system 15, the MIR system 10 can be configured to output the time delay between transmission and reception of the pulses. The control system 15 then compares the time delay to first and second predetermined time delays which correspond to the first and second predetermined distances discussed above. The control system 15 then operates in the same manner as discussed above with respect to exceeding the first and second predetermined distances depending on whether the time delay exceeds the first and/or second predetermined time delays.

The anti-two block device eliminates the use of physical contact to prevent anti-two blocking. Also, the anti-two block device does not include any moving parts, and is not exposed to the environment. The response time, compared to anti-two block devices based on contact, is greatly increased as well. Accordingly, the anti-two block device according to the present invention does not suffer from the problems and disadvantage of contact based anti-two block devices.

While the embodiments of the present invention discussed above activate indicator lights, in addition or instead of the indicator lights, warning sounds may be issued.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed is:

1. An anti-two block device, comprising:

a boom including a nose;

a cable;

a load support suspended from said nose of said boom by said cable;

a non-contact distance measuring device mounted on said nose of said boom, said non-contact distance measuring device being operative for transmitting a signal toward said load support and for receiving a signal back from said load support, for measuring the distance between said load support and said nose of said boom, said non-contact distance measuring device generating response signals based upon the signals received back from said load support;

an indicator;

a cable control mechanism for controlling movement of said cable;

a control system generating control signals for controlling said indicator and cable control mechanism after receiving said response signal;

said indicator being responsive to receiving a first output control signal from said control system to indicate a first distance from said load support to said nose of said boom; and said cable control mechanism being responsive to receiving said first output control signal to reduce the speed of said cable and being responsive to a second output control signal from said control system to stop movement of said cable when said load support is at a second distance from said nose of said boom.

2. The device according to claim 1, wherein the signal received back from said load support is a reflection of the signal transmitted toward said load support.

3. The device according to claim 1, wherein said non-contact distance measuring device is one of a micro-impulse radar distance measuring device, a sonic distance measuring device, an ultrasonic distance measuring device, an infra-red distance measuring device, and a laser distance measuring device.

4. The device according to claim 1, wherein the response signals include a distance measurement, and wherein said control system compares the distance measurement to a first predetermined threshold value and sends said first output control signal to said indicator based upon an outcome of the comparison.

* * * * *

UNITED STATES PATENT AND TRADEMARK OFFICE
CERTIFICATE OF CORRECTION

PATENT NO.    : 6,343,703 B1
DATED         : February 5, 2002
INVENTOR(S)   : Jon E. Fleagle et al.

It is certified that error appears in the above-identified patent and that said Letters Patent is hereby corrected as shown below:

<u>Title page,</u>
Item [54], Title, "NON-CONTRACT" should be -- NON-CONTACT --.

Signed and Sealed this

Twentieth Day of August, 2002

*Attest:*

*Attesting Officer*

JAMES E. ROGAN
*Director of the United States Patent and Trademark Office*